(12) United States Patent
Alvarez-Heredia et al.

(10) Patent No.: US 9,645,791 B2
(45) Date of Patent: May 9, 2017

(54) MULTIPLIER UNIT WITH SPECULATIVE ROUNDING FOR USE WITH DIVISION AND SQUARE-ROOT OPERATIONS

(71) Applicant: Apple Inc., Cupertino, CA (US)

(72) Inventors: Boris S Alvarez-Heredia, Sunnyvale (CA); Edvin Catovic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 14/305,651

(22) Filed: Jun. 16, 2014

(65) Prior Publication Data

US 2015/0363169 A1    Dec. 17, 2015

(51) Int. Cl.
    *G06F 7/544*     (2006.01)
    *G06F 7/535*     (2006.01)
    *G06F 7/552*     (2006.01)
    G06F 7/499       (2006.01)

(52) U.S. Cl.
    CPC ............ *G06F 7/5443* (2013.01); *G06F 7/535* (2013.01); *G06F 7/5525* (2013.01); *G06F 7/49936* (2013.01); *G06F 7/49947* (2013.01); *G06F 2207/5355* (2013.01)

(58) Field of Classification Search
    None
    See application file for complete search history.

(56) References Cited

U.S. PATENT DOCUMENTS

| | | | | |
|---|---|---|---|---|
| 5,446,651 A | * | 8/1995 | Moyse | G06F 7/5336 708/630 |
| 5,606,677 A | * | 2/1997 | Balmer | G06F 7/5324 708/625 |
| 6,381,625 B2 | | 4/2002 | Oberman et al. | |
| 7,398,289 B2 | | 7/2008 | Visalli et al. | |
| 7,730,117 B2 | | 6/2010 | Fleischer et al. | |
| 2013/0007085 A1 | | 1/2013 | Drane | |
| 2013/0179664 A1 | * | 7/2013 | Olson | G06F 9/3885 712/215 |
| 2015/0149522 A1 | * | 5/2015 | Boersma | G06F 7/483 708/495 |

* cited by examiner

*Primary Examiner* — Michael D Yaary
(74) *Attorney, Agent, or Firm* — Meyertons, Hood, Kivlin, Kowert & Goetzel, P.C.

(57) ABSTRACT

Embodiments of a multiplier unit that may be used for division and square root operations are disclosed. The embodiments may provide a reduced and fixed latency for denormalization and rounding used in the division and square root operations. A storage circuit may be configured to receive first and second source operands. A multiplier circuit may be configured to perform a plurality of multiplication operations dependent upon the first and second source operands. Each result after an initial result of the multiplier may also depend on at least one previous result. Circuitry may be configured to perform a shift operation and a rounding operation on a given result of the plurality of results. An error of the given result may be less than a predetermined threshold value.

20 Claims, 7 Drawing Sheets

MULTIPLIER UNIT WITH SPECULATIVE ROUNDING FOR USE WITH DIVISION AND SQUARE-ROOT OPERATIONS

BACKGROUND

Technical Field

Embodiments described herein relate to integrated circuits, and more particularly, to techniques for performing arithmetic operations within integrated circuits.

Description of the Related Art

Computing systems typically include one or more processors or processing cores which are configured to execute program instructions. The program instructions may be stored in one of various locations within a computing system, such as, e.g., main memory, a hard drive, a CD-ROM, and the like.

Processors include various functional blocks, each with a dedicated task. For example, a processor may include an instruction fetch unit, a memory management unit, and an arithmetic logic unit (ALU). An instruction fetch unit may prepare program instruction for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data Some arithmetic operations may not have dedicated hardware within an ALU. Such arithmetic operations, such as, e.g., division, may be implemented as a series of program instructions making use of functional blocks within the ALU. In some cases, additional circuitry may be added to an ALU to implement one of various algorithms for performing such arithmetic operations.

SUMMARY OF THE EMBODIMENTS

Various embodiments of a multiplier unit are disclosed. Broadly speaking, a circuit and a method are contemplated in which a storage circuit receives and stores a first source operand and a second source operand. A plurality of results may be generated by a multiplier in response to an operation and dependent upon the stored first and second operands, and each result after an initial result may depend upon at least one previous result. Circuitry may be configured to perform a shift operation and a rounding operation on a given result from the multiplier, where an error of the given result is less than a predetermined threshold value.

In one embodiment, each result of the plurality of results corresponds to an approximation of a result of the operation. The operation may include a division operation or a square root operation. In another embodiment, the circuitry may be further configured to perform the shift operation responsive to a determination that the given result is denormal or an integer.

In a further embodiment, to perform the rounding operation, the circuitry may be further configured to perform a first rounding operation and a second rounding operation.

BRIEF DESCRIPTION OF THE DRAWINGS

The following detailed description makes reference to the accompanying drawings, which are now briefly described.

Figure 1:
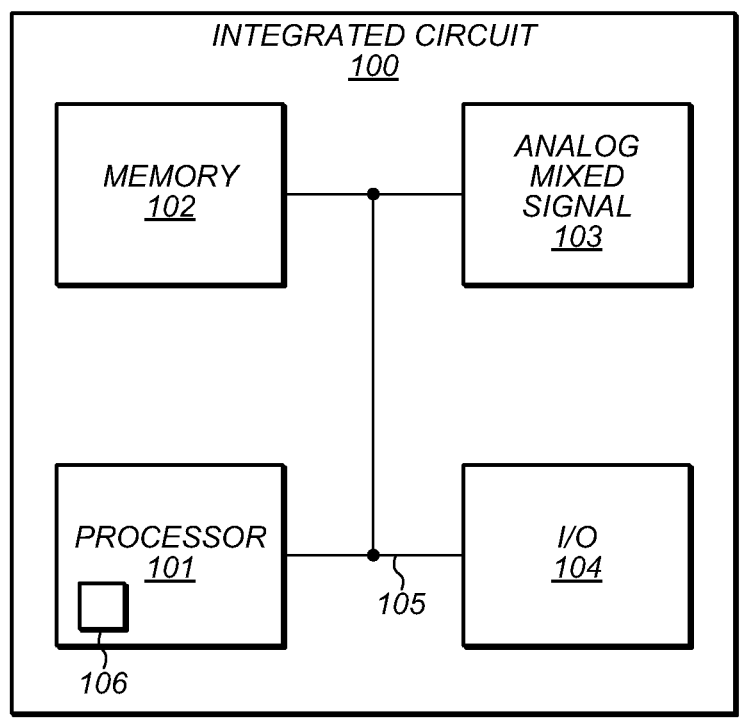
FIG. 1 illustrates an embodiment of an integrated circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In a computing system, arithmetic operations may be performed by an arithmetic logic unit (ALU) of a processor. The ALU may contain dedicated logic circuits, such as, e.g., an adder or multiplier, that are designed to perform the desired arithmetic function. Some arithmetic operations, however, may be infrequently used, or may be costly, in terms of silicon area, to implement in logic circuits, may be implemented using multiple program instructions. In other cases, other logic circuits, (e.g., a multiplier) may be reused, with additional logic circuits, in an iterative fashion to perform the desired arithmetic operation.

Using existing circuits within an ALU to perform other arithmetic operations may necessitate modifications to the existing circuits that may increase their size and power consumption. Additionally, extra latency may result through the ALU as a result of additional processing necessary (e.g., formatting results from a multiplier) to perform the other arithmetic operations. The embodiments illustrated in the drawings and described below may provide techniques for limiting an increase in area and power as well as providing a fixed latency through the circuits.

System-on-a-Chip Overview

A block diagram of an integrated circuit is illustrated in FIG. 1. In the illustrated embodiment, the integrated circuit 100 includes a processor 101 coupled to memory block 102, and analog/mixed-signal block 103, and I/O block 104 through internal bus 105. In various embodiments, integrated circuit 100 may be configured for use in a desktop computer, server, or in a mobile computing application such as, e.g., a tablet or laptop computer.

As described below in more detail, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processing device 101 may include one or multiplier units 106, which may be configured to perform iterative multiplication operations, the results of which may be used to determine the results of other operations, such as division or square root, for example.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 1, a single memory block is depicted. In other embodiments, any suitable number of memory blocks may be employed.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with wireless networks.

I/O block 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between integrated circuit 100 and one or more devices (e.g., other computer systems or integrated circuits) coupled to integrated circuit 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Processor Overview

Figure 2:
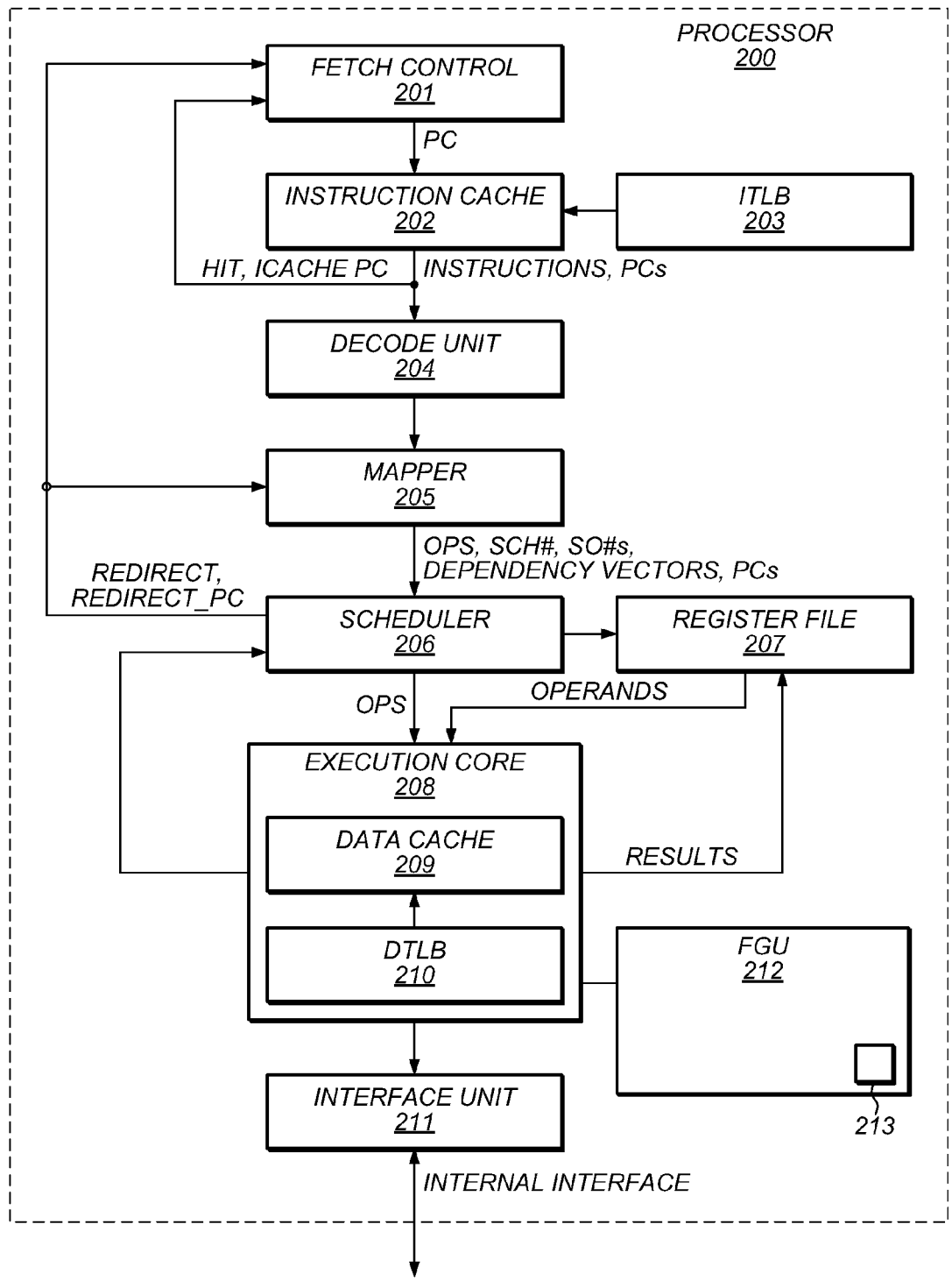
FIG. 2 illustrates an embodiment of a processor.

Turning now to FIG. 2, a block diagram of an embodiment of a processor 200 is shown. Processor 200 may, in some embodiments, correspond to processor 101 of SoC 100 as illustrated in FIG. 1. In the illustrated embodiment, the processor 200 includes a fetch control unit 201, an instruction cache 202, a decode unit 204, a mapper 209, a scheduler 206, a register file 207, an execution unit 208, an interface unit 211, and a floating point/graphics unit (FGU) 212. The fetch control unit 201 is coupled to provide a program counter address (PC) for fetching from the instruction cache 202. The instruction cache 202 is coupled to provide instructions (with PCs) to the decode unit 204, which is coupled to provide decoded instruction operations (ops, again with PCs) to the mapper 205. The instruction cache 202 is further configured to provide a hit indication and an ICache PC to the fetch control unit 201. The mapper 205 is coupled to provide ops, a scheduler number (SCH#), source operand numbers (SO#s), one or more dependency vectors, and PCs to the scheduler 206. The scheduler 206 is coupled to receive replay, mispredict, and exception indications from the execution core 208, is coupled to provide a redirect indication and redirect PC to the fetch control unit 201 and the mapper 205, is coupled to the register file 207, and is coupled to provide ops for execution to the execution core 208. The register file is coupled to provide operands to the execution core 208, and is coupled to receive results to be written to the register file 207 from the execution core 208. The execution core 208 is coupled to the interface unit 211, which is further coupled to an external interface of the processor 200.

Fetch control unit 201 may be configured to generate fetch PCs for instruction cache 202. In some embodiments, fetch control unit 201 may include one or more types of branch predictors 212. For example, fetch control unit 201 may include indirect branch target predictors configured to predict the target address for indirect branch instructions, conditional branch predictors configured to predict the outcome of conditional branches, and/or any other suitable type of branch predictor. During operation, fetch control unit 201 may generate a fetch PC based on the output of a selected branch predictor. If the prediction later turns out to be incorrect, fetch control unit 201 may be redirected to fetch from a different address. When generating a fetch PC, in the absence of a nonsequential branch target (i.e., a branch or other redirection to a nonsequential address, whether speculative or non-speculative), fetch control unit 201 may generate a fetch PC as a sequential function of a current PC value. For example, depending on how many bytes are fetched from instruction cache 202 at a given time, fetch control unit 201 may generate a sequential fetch PC by adding a known offset to a current PC value.

The instruction cache 202 may be a cache memory for storing instructions to be executed by the processor 200. The instruction cache 202 may have any capacity and construction (e.g. direct mapped, set associative, fully associative, etc.). The instruction cache 202 may have any cache line size. For example, 64 byte cache lines may be implemented in an embodiment. Other embodiments may use larger or smaller cache line sizes. In response to a given PC from the fetch control unit 201, the instruction cache 202 may output up to a maximum number of instructions. It is contemplated that processor 200 may implement any suitable instruction set architecture (ISA), such as, e.g., the ARM™, PowerPC™, or x86 ISAs, or combinations thereof.

In some embodiments, processor 200 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 202 may be partially or completely addressed using physical address bits rather than virtual address bits. For example, instruction cache 202 may use virtual address bits for cache indexing and physical address bits for cache tags.

In order to avoid the cost of performing a full memory translation when performing a cache access, processor 200 may store a set of recent and/or frequently-used virtual-to-physical address translations in a translation lookaside buffer (TLB), such as Instruction TLB (ITLB) 203. During operation, ITLB 203 (which may be implemented as a cache, as a content addressable memory (CAM), or using any other suitable circuit structure) may receive virtual address information and determine whether a valid translation is present. If so, ITLB 203 may provide the corresponding physical address bits to instruction cache 202. If not, ITLB 203 may cause the translation to be determined, for example by raising a virtual memory exception.

The decode unit 204 may generally be configured to decode the instructions into instruction operations (ops). Generally, an instruction operation may be an operation that the hardware included in the execution core 208 is capable of executing. Each instruction may translate to one or more instruction operations which, when executed, result in the operation(s) defined for that instruction being performed according to the instruction set architecture implemented by the processor 200. In some embodiments, each instruction may decode into a single instruction operation. The decode unit 204 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 204 and mapper 205 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 204 may be provided to the mapper 205. The mapper 205 may implement register renaming to map source register addresses from the ops to the source operand numbers (SO#s) identifying the renamed source registers. Additionally, the mapper 205 may be configured to assign a scheduler entry to store each op, identified by the SCH#. In an embodiment, the SCH# may also be configured to identify the rename register assigned to the destination of the op. In other embodiments, the mapper 205 may be configured to assign a separate destination register number. Additionally, the mapper 205 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 205 may provide the ops, along with SCH#, SO#s, PCs, and dependency vectors for each op to the scheduler 206. The scheduler 206 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 206 may be configured to schedule the ops for execution in the execution core 208. When an op is scheduled, the scheduler 206 may be configured to read its source operands from the register file 207 and the source operands may be provided to the execution core 208. The execution core 208 may be configured to return the results of ops that update registers to the register file 207. In some cases, the execution core 208 may forward a result that is to be written to the register file 207 in place of the value read from the register file 207 (e.g. in the case of back to back scheduling of dependent ops).

The execution core 208 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 208 may be configured to execute predicted branch ops, and may receive the predicted target address that was originally provided to the fetch control unit 201. The execution core 208 may be configured to calculate the target address from the operands of the branch op, and to compare the calculated target address to the predicted target address to detect correct prediction or misprediction. The execution core 208 may also evaluate any other prediction made with respect to the branch op, such as a prediction of the branch op's direction. If a misprediction is detected, execution core 208 may signal that fetch control unit 201 should be redirected to the correct fetch target. Other units, such as the scheduler 206, the mapper 205, and the decode unit 204 may flush pending ops/instructions from the speculative instruction stream that are subsequent to or dependent upon the mispredicted branch.

Execution unit 208 may also be configured to execute and provide results for certain types of fetched instructions. In one embodiment, execution unit 208 may be configured to execute certain integer-type instructions defined in the implemented ISA, such as arithmetic, logical, and shift instructions. It is noted that in the illustrated embodiment instructions destined for floating point/graphics unit (FGU) 212 pass through execution unit 208. However, in alternative embodiments it is contemplated that such instructions may be issued directly to their respective units without passing through execution unit 208.

The execution core may include a data cache 209, which may be a cache memory for storing data to be processed by the processor 200. Like the instruction cache 202, the data cache 209 may have any suitable capacity, construction, or line size (e.g. direct mapped, set associative, fully associative, etc.). Moreover, the data cache 209 may differ from the instruction cache 202 in any of these details. As with instruction cache 202, in some embodiments, data cache 209 may be partially or entirely addressed using physical address bits. Correspondingly, a data TLB (DTLB) 210 may be provided to cache virtual-to-physical address translations for use in accessing the data cache 209 in a manner similar to that described above with respect to ITLB 203. It is noted that although ITLB 203 and DTLB 210 may perform similar functions, in various embodiments they may be implemented differently. For example, they may store different numbers of translations and/or different translation information.

Floating point/graphics unit (FGU) 212 may be configured to execute and provide results for certain floating-point and graphics-oriented instructions defined in the implemented ISA. For example, in one embodiment FGU 212 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Depending on the implementation of FGU 212, some instructions (e.g., some transcendental or extended-precision instructions) or instruction operand or result scenarios (e.g., certain denormal operands or expected results) may be trapped and handled or emulated by software. FGU 212 may include one or more multiplier units 213 which may, in various embodiments, correspond to multiplier units 106 as illustrated in FIG. 1. Multiplier unit 213 may be employed in an iterative fashion to approximate values for other arithmetic operations, such as division and square root, for example.

The register file 207 may generally include any set of registers usable to store operands and results of ops executed in the processor 200. In some embodiments, the register file 207 may include a set of physical registers and the mapper 205 may be configured to map the logical registers to the physical registers. The logical registers may include both architected registers specified by the instruction set architecture implemented by the processor 200 and temporary registers that may be used as destinations of ops for temporary results (and sources of subsequent ops as well). In other embodiments, the register file 207 may include an architected register set containing the committed state of the logical registers and a speculative register set containing speculative register state.

The interface unit 211 may generally include the circuitry for interfacing the processor 200 to other devices on the external interface. The external interface may include any type of interconnect (e.g. bus, packet, etc.). The external interface may be an on-chip interconnect, if the processor 200 is integrated with one or more other components (e.g. a system on a chip configuration). The external interface may be on off-chip interconnect to external circuitry, if the processor 200 is not integrated with other components. In various embodiments, the processor 200 may implement any instruction set architecture.

It is noted that the embodiment of a processing device illustrated in FIG. 2 is merely an example. In other embodiments, different functional block or configurations of functional blocks are possible and contemplated.

Division and Square Root Algorithms

Computing systems, such as, e.g., integrated circuit 100 as illustrated in FIG. 1, may be limited in area due to manufacturing cost or form factor considerations. To keep within area targets, circuit and logic designers may elect to implement certain functions as a set of software instructions, thereby trading processing efficiency for area. In other cases, some functions may re-use other hardware in a different fashion to perform the desired function. Examples of such re-use include division and square root operations that make use of multiplier unit hardware to implement the desired operation without creating dedicated hardware. In such cases, additional logic circuits may be added to a multiplier unit to allow one of various division or square root algorithms to be performed.

Algorithms used by a processor or other computing device for performing a division or square root operation can be generally classified as either "fast" or "slow." Slow algorithms generate a single digit of the final quotient per iteration. Examples of slow algorithms include restoring, non-restoring, and Sweeney, Robertson, and Tocher (SRT) algorithms.

In contrast, fast division algorithms begin with an approximation to the final quotient. In a given iteration, the estimation of the quotient is refined until the quotient reaches a desired level of precision. Examples of fast algorithms include the Newton-Raphson and Goldschmidt algorithms.

As shown in equation 1, a quotient Q may be written as a product of a dividend a and a reciprocal of a divisor b. In the case of the Newton-Raphson algorithm, an initial approximation of the reciprocal of the divisor is refined through multiple iterations, until a desired level of accuracy is achieved. In various embodiments, a final value of the divisor may be rounded. The final quotient may then be realized through a multiplication of the dividend by the estimated divisor.

$$Q = \frac{a}{b} = a\left(\frac{1}{b}\right) \qquad (1)$$

To implement the Newton-Raphson algorithm, two dependent multiplication operations may be needed at a given iteration. For example, as shown in equation 2, to determine the next approximation of the reciprocal of the divisor, i.e., $X_{i+1}$, the value $2-DX_i$, where $X_i$ is a current value of the reciprocal and D is the divisor, must first be evaluated.

$$X_{i+1} = X_i(2 - bX_i) \qquad (2)$$

The Goldschmidt algorithm is similar to the Newton-Raphson algorithm with the exception that the multiplication operations performed for a given iteration are independent. As shown in equation 3, a next value of the numerator, $N_{i+1}$, is dependent upon a multiplication of a current value of the numerator, $N_i$, a current scaling value $R_i$, and a next value of the denominator, $D_{i+1}$, is dependent upon a multiplication of a current value of the denominator, $D_i$, and $R_i$. The next value of the scaling factor, $R_{i+1}$, is derived from the current value of the scaling factor. By employing independent multiplications, the multiplication may, in various embodiments be pipelined through a multiplier, allowing for higher throughput.

$$N_{i+1} = N_i R_i$$

$$D_{i+1} = D_i R_i$$

$$R_{i+1} = 2 - R_i \qquad (3)$$

It is noted that although the above discussion is generally directed towards division, in other embodiments, similar techniques may be applied to other arithmetic operations. For example, square root may be performed by using the function $1/\sqrt{x}$ instead of merely a reciprocal of a divisor as is the case with a division operation.

Multiplier Units

Figure 3:
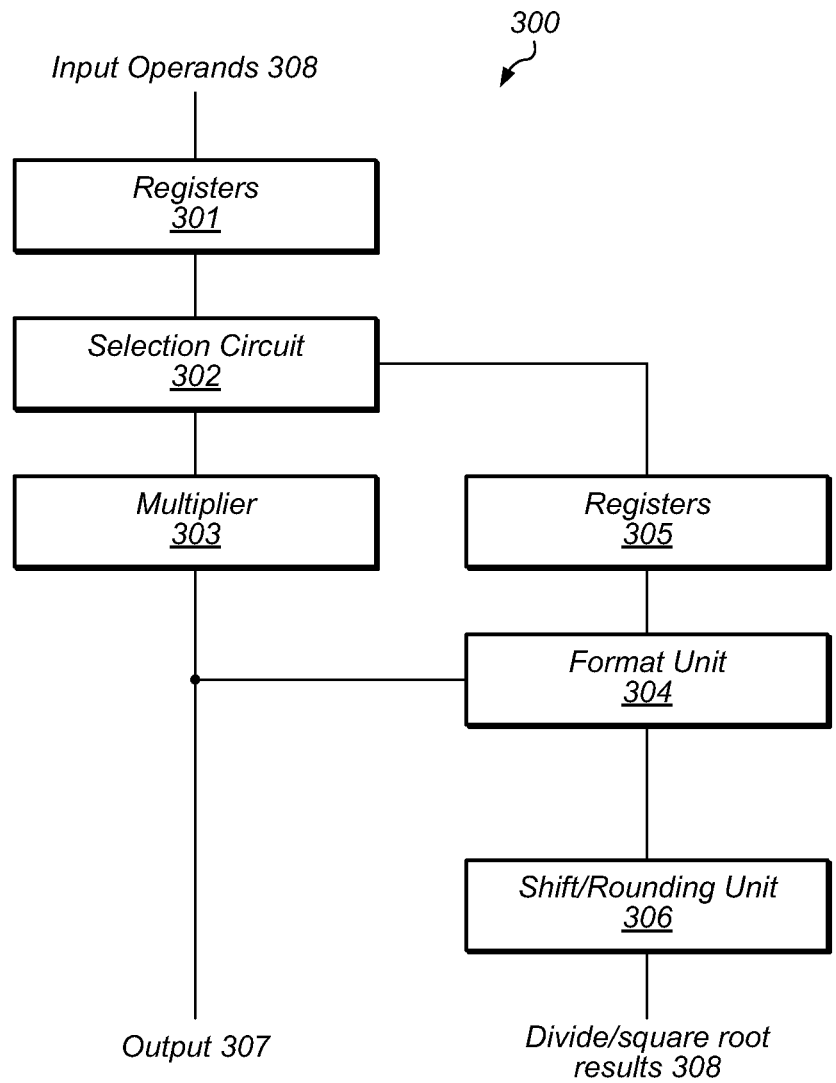
FIG. 3 illustrates an embodiment of a multiplier unit.

Turning to FIG. 3, an embodiment of multiplier unit is illustrated. In the illustrated embodiment, multiplier unit 300 includes registers 301, selection circuit 302, multiplier 303, format unit 304, registers 305, and shift/rounding unit 306. Multiplier unit 300 may, in some embodiments, be used to implement one of the aforementioned algorithms, such as Newton-Raphson or Goldschmidt, for example. In various embodiments, multiplier unit 300 may be configured to produce an approximation of a quotient of two normalized numbers.

Registers 301 may be configured to store input operands 308. In various embodiments, registers 301 may include one or more latches or flip-flops circuits, or other suitable storage circuit. Each storage circuit may be configured to store a single bit of a given input operand responsive to a clock or other timing signal. Although shown as a single block, registers 301 may include any suitable number of sub-registers, each of which is configured to store one of multiple received operands. For example, registers 301 may include two separate sub-registers each configured to store a dividend and a divisor, respectively, for a division operation.

Selection circuit 302 may be configured to select between the registered, i.e., stored in registers 301, input operands and iteration values stored in registers 305. The selection may be controlled by additional circuitry (not shown) that determines what numbers will be multiplied during a given iteration of a division, square root, or other suitable iterative arithmetic operation. Selection circuit 302 may include separate paths for each input to multiplier 303. For example, multiplier 303 may be configured to multiply two operands, in which case, selection circuit 302 includes a selection path for each operand. In some embodiments, each selection path may include multiple stages of multiplex circuits. The path for a given input to multiplier 303 may include a first stage that may select between numerator and denominator values, and a second stage configured to select between an output of the first stage and one of the input operands 308. Other inputs to multiplier 303 may include paths through selection circuit 302 that may select between any suitable set of inputs.

Multiplex circuits, such as those shown and described herein, may be constructed in accordance with one of various design styles. For example, in some embodiments, a multiplex circuit may include a plurality of tri-state buffers whose outputs are coupled together in a wired-OR fashion, and whose control inputs are dependent upon one of the selection inputs (not shown). In other embodiments, a multiplex circuit may include a plurality of logic gates configured to implement the desired multiplex.

Multiplier 303 may be configured to multiply at least two operands, and may be designed in accordance with one of various multiplier architectures. For example, multiplier 303 may employ Wallace tree, or other suitable multiplier algorithm. In various embodiments, multiplier may be configured to allow operands of any suitable length. When used for the purpose of multiplication, the output 307 of multiplier 303 may be used directly by other logic circuits with a processor, such as processor 200, for example.

When multiplier unit 300 is used to approximate a quotient or square root, the output of multiplier 303 may be provided to format unit 304. In some cases, the use of Goldschmidt, or other suitable algorithm may necessitate an increase in the number of bits in each operand to allow for sufficient accuracy in the end result. Adding additional bits may not only contribute to additional area, but also increased power consumption due to the added switching of circuitry related to the additional bits. As will be described in more detail below in regard to FIG. 7, by splitting a multiplication operation into several separate multiplications between various subsets of bits of the operands, a desired level of accuracy necessary for the Goldschmidt algorithm may be achieved with only a minimal number of bits added. For example, to implement the Goldschmidt algorithm seven bits may need to be added to the double precision multiple. This would necessitate a 61×61 multiplier circuit, such as, multiplier 303, for example. As described below, however, a suitable level of accuracy may be maintained using only 55×55 multiplier circuit.

Format unit 304 may be configured to format results from multiplier 303 to generate an approximation of a quotient or square root value, and send the formatted results to registers 305 for temporary storage. When the approximation of the quotient or square root is of a desired level of accuracy, i.e., the approximation is sufficiently close to the actual answer that only minor adjustments are required, the approximation value is sent to shift/rounding unit 306 for final adjustments. In various embodiments, format unit 304 may include any suitable combinatorial logic circuit capable of truncating, shifting, inverting, or any other suitable operation, that need to be performed on the results of a given iteration of a division or square root operation.

Like registers 301, registers 305 may include one or more latches or flip-flops circuits, or other suitable storage circuit. Each storage circuit may be configured to store a corresponding data bit of an output from format unit 304 responsive to a clock or other timing signal. Although shown as a single block, registers 305 may include any suitable number of sub-registers, each of which is configured to store one of multiple outputs from format unit 304.

Shift/rounding unit 306 may be configured to perform both a shift operation and one or more rounding operations. In some embodiments, the shift operation may be performed as part of integer division (i.e., dividing two integer values) while, in other embodiments, the shift operation may be performed to produce a normalized final quotient or square root results based on the final approximation from format unit 304. Shift/round unit 306 may perform rounding operations in accordance with one of various standards, such as, the Institute for Electrical and Electronics Engineers (IEEE) 754, or other suitable standard. In various embodiments, shift/rounding unit 306 may include any suitable combination of logic circuits necessary to perform truncation, decrementing, incrementing, or other operation, necessary to implement the desired rounding standard.

It is noted that the embodiment illustrated in FIG. 3 is merely an example. In other embodiments, different functional blocks and different configurations of functional blocks are possible and contemplated.

Figure 4:
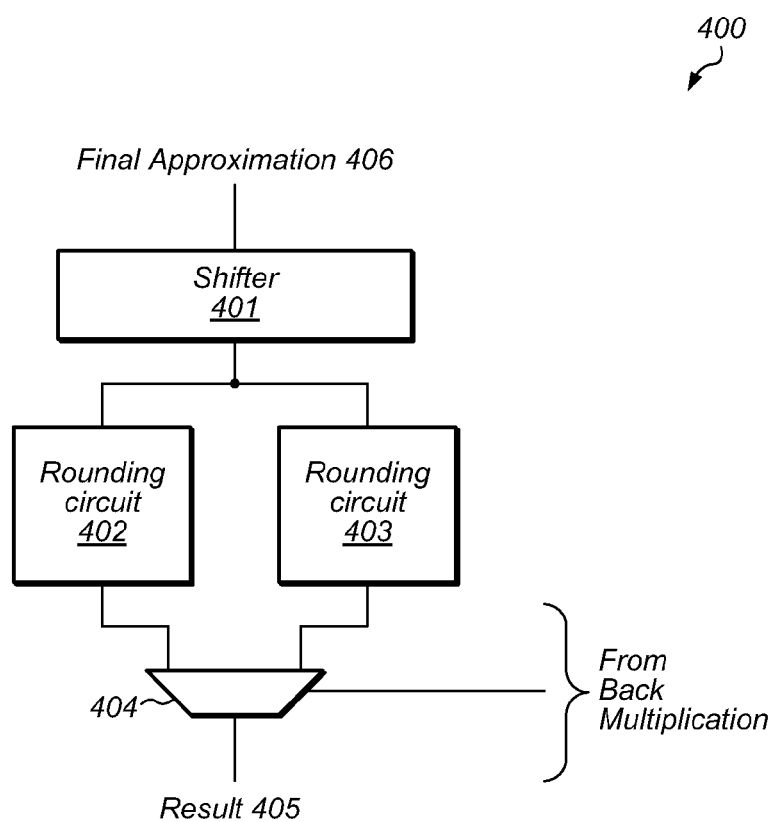
FIG. 4 illustrates an embodiment of a shift/round unit.

An embodiment of a shift/round unit is depicted in FIG. 4 which may, in some embodiments, correspond to shift/round unit 306 as depicted in FIG. 3. In the illustrated embodiment, shift/round unit 400 includes shifter 401, rounding circuits 402 and 403, and multiplex circuit 404.

Shifter 401 may receive a final approximation from an iterative arithmetic operation, such as, the Goldschmidt algorithm implementing division, for example. In various embodiments, shifter 401 may be configured to determine if the final approximation result is denormal, i.e., an underflow conditions exists, and in response to the determination, perform a shift right operation to remedy the underflow. The number of bits to shift may be determined by analyzing exponent values of the source operands. For example, in response to a determination that a difference between the exponent values of the source operands is in a denormal range, the final approximation may be shifted until an exponent value of the final approximation reaches a desired level.

Shifter 401 may be designed in accordance with one of various design styles. For example, shifter 401 may include multiple flip-flop circuits connected in a serial fashion and connected to a common clock or other timing signal. The flip-flops may be loaded with data in parallel and then activated (or "clocked") multiple times to transfer data from one flip-flop to an adjacent flip-flop (either to the right or left). In some embodiments, an output of a last flip-flop may be coupled to the input of a first flip-flop, thereby creating a circular shift register. Additional circuitry may be included, in some embodiments, to track bits that are shifted out during various shift operations.

Rounding circuits 402 and 403 may be configured to perform to truncate, increment, or decrement a received input in accordance an analysis of a remainder, or an error analysis of the final approximation, or with one of various rounding standards, such as, IEEE 754, for example, or any suitable combination thereof. In the case of a division operation, the remainder may be a difference between a back-multiplication result and the dividend of the division operation. For square root operations, the remainder may be a difference between a back-multiplication result and the value that is being operated upon. Each of rounding circuits 402 and 403 may receive information from an inexact determination operation, i.e., a determination if the remainder is zero. The inexact operation may, in various embodiments, include a determination of trailing zeros of a back multiply result. For example, if the position of the trailing one of the back multiply result is below a predetermined value, such as, e.g., −52, then the remainder may not be zero. Alternatively, if the position of the trailing one of the back multiply result is above or equal to the predetermined value, then the remainder may be zero.

In some embodiments, rounding circuit 402 may be configured to round as if the remainder is negative, and rounding circuit 403 may be configured to round as if the remainder is positive. Rounding circuits 402 and 403 may operate in parallel on the output of shifter 401; simultaneously generating both a result as if the remainder is both positive and negative while the back multiplication is being performed. In some embodiments, by performing both rounding options in parallel, a latency of shift/round unit 401 may be reduced. Rounding circuits 402 and 403 may include any suitable collection of logic circuits configured to perform the aforementioned truncate, increment, and decrement operations. In some embodiments, rounding circuits 402 and 403 may share circuitry to minimize the impact on area of the two rounding circuits.

Multiplex circuit 404 may be configured to select between the output of rounding circuit 402 and rounding circuit 403. The selection may be made dependent upon information from a back multiplication. In some embodiments, a least significant bit (LSB) of the back multiplication result may be used as the selection criteria for multiplex circuit 404. The LSB may, in various embodiments, correspond to the sign of the remainder.

The embodiment illustrated in FIG. 4 is merely an example. In various other embodiments, different numbers and types of rounding circuits may be employed.

Figure 5:
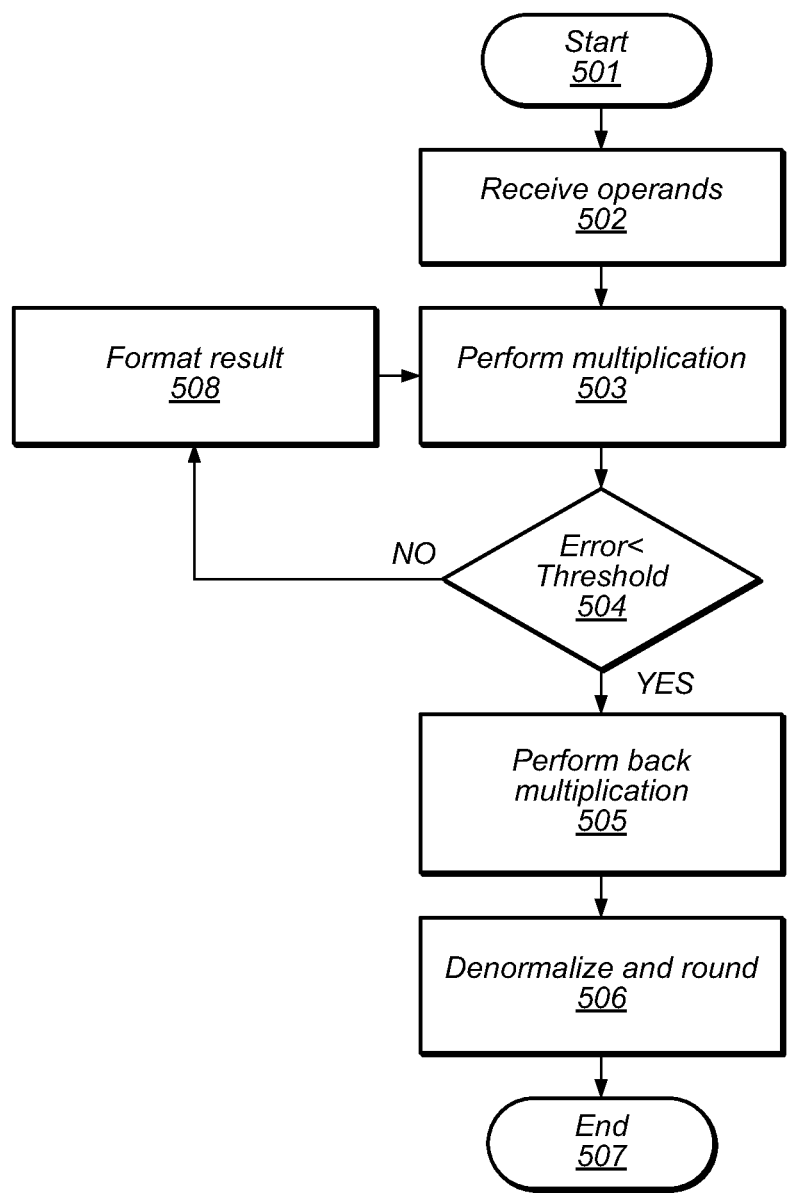
FIG. 5 depicts a flow diagram illustrating an example method for operating a multiplier unit.

Turning to FIG. 5, a flow diagram depicting an embodiment of a method of operating a multiplier unit is illustrated. Referring collectively to the multiplier unit of FIG. 3, and the flow diagram of FIG. 5, the method begins in block 501.

Registers 301 may then receive operands (block 502). The operands may be a dividend and a divisor to be operated upon by a division operation. In other embodiments, a single operand may be received if the operation is to be performed is a square root operation.

An initial multiplication may then be performed (block 503). In some embodiments, selection circuit 302 may be configured to allow the operands stored in registers 301 to transfer to multiplier 303. The multiplication performed may be part of an iterative algorithm such as, e.g., Newton-Raphson or Goldschmidt, in which repeated multiplications are used to estimate a quotient, square root, or any other suitable mathematical operation. In some cases, an iteration of the algorithm may require more than one multiplication operation. When the multiplication operations are independent, such as those used in the Goldschmidt algorithm, more than one independent multiplication operations may be pipelined through multiplier 303. In some embodiments, an initial scaling factor value may be selected from a look-up table dependent upon value of the received operands, or using any other suitable method.

The operation may then depend on an error associated with the estimated value of the desired operation (block 504). The associated error may be predetermined dependent on a desired level of accuracy of a final value of the desired operation. When the error is greater than the threshold value, the results of the current iteration may be formatted by format unit 304 (block 508). The formatting may include any suitable combination of truncation, inversion, and shifting necessary to determine a next value of the remainder value and prepare the multiplication results for the next iteration. The method may then continue as described above from block 503. In various embodiments, the formatted results may be stored in registers 305 until multiplier 303 is ready, at which point, selection circuit 302 may select the formatted results stored in registers 305 for processing by multiplier 303.

When the error is less than or equal to the threshold value, a back multiplication may be performed dependent upon a result of the final iteration (block 505). In some embodiments, a least significant bit (LSB) of the back multiplication result may be used in the rounding process. The back multiplication result may, in various embodiments, be performed by multiplier 303.

Once the back multiplication has started, the result of final iteration may then be denormalized and rounded (block 506). It is noted that although block 506 is depicted as being performed after block 505, in various embodiments, the operations of block 506 may be performed in parallel with the back multiplication of block 505. The denormalization may include a right shift of the result of the final iteration by a number of bits determined by an analysis of the source operands. Multiple rounding operations may be performed, and a particular result of the rounding operations may be selected dependent upon a value of the back multiplication. With the completion of the rounding operation, the method may conclude in block 507.

It is noted that the method depicted in the flowchart of FIG. 5 is merely an example. In other embodiments, different operations and different orders of operations are possible and contemplated.

Figure 6:
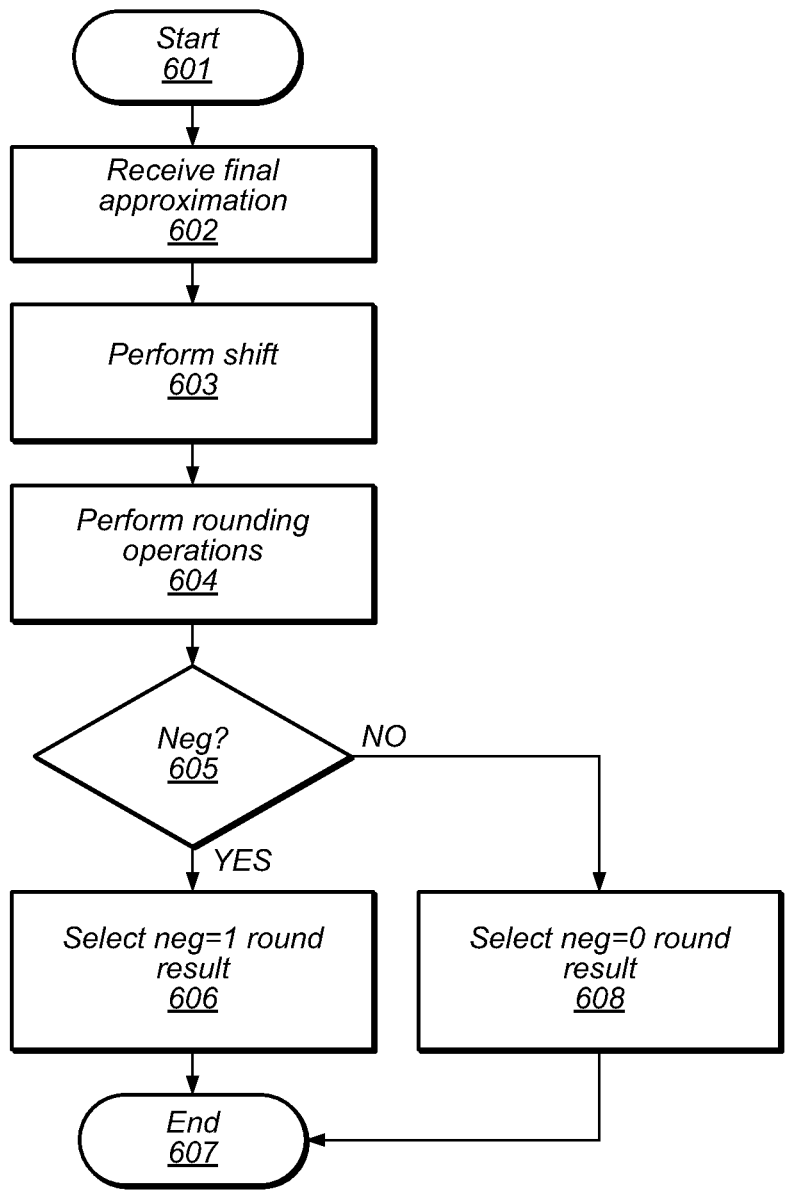
FIG. 6 depicts a flow diagram illustrating an example method for rounding a arithmetic result.

A flow diagram of an embodiment of a method for performing speculative rounding is illustrated in FIG. 6. Referring collectively the embodiment of the round/shift unit illustrated in FIG. 4, and the flow diagram of FIG. 6, the method begins in block 601. A final approximation from a multiplier, such as, e.g., multiplier 303, may then be received by shift unit 401 (block 602). In some embodiments, the final approximation may be a quotient from a division operation or a value of a square root operation.

Shift unit 401 may then perform a shift of the bits within the final approximation (block 603). In some embodiments, the shift may be performed in response to a determination that the final approximation is denormal or an integer. The shift operation may, in various embodiments, include a right-shift by a determined number of bits. The number of bits by which to shift may be determined by an analysis of the source operands which may be performed in parallel with the generation of the final approximation.

With the conclusion of the shift operation, rounding units 402 and 403 may perform their respective rounding operations (block 604). In some embodiments, rounding unit 402 may perform a rounding operation as if the remainder is negative, and rounding unit 403 may perform a rounding operation as if the remainder is positive. The rounding operations may include error analysis of the final approximation (also referred to herein as "remainder analysis") and decrementing the final approximation, as well as rounding a result after a shift operation for denormalization. By combining error analysis and rounding necessary after denormalization, both rounding steps may be performed, in some embodiments, with no additional latency. The method may then depend on the sign of a remainder (block 605). The back multiplication may, in various embodiments, be performed in parallel with the shift and rounding operations.

When the sign of the remainder is negative, the rounded value calculated on the assumption that the remainder is negative may be selected (block 606), at which point, the method may conclude in block 607. When the sign of the remainder is positive, the rounded value calculated on the assumption that the remainder is positive may be selected (block 608). The method may then conclude in block 607.

The operations of the method illustrated in FIG. 6 are depicted as being performed in a sequential fashion. In other embodiments, one or more of the operations may be performed in parallel.

Figure 7:
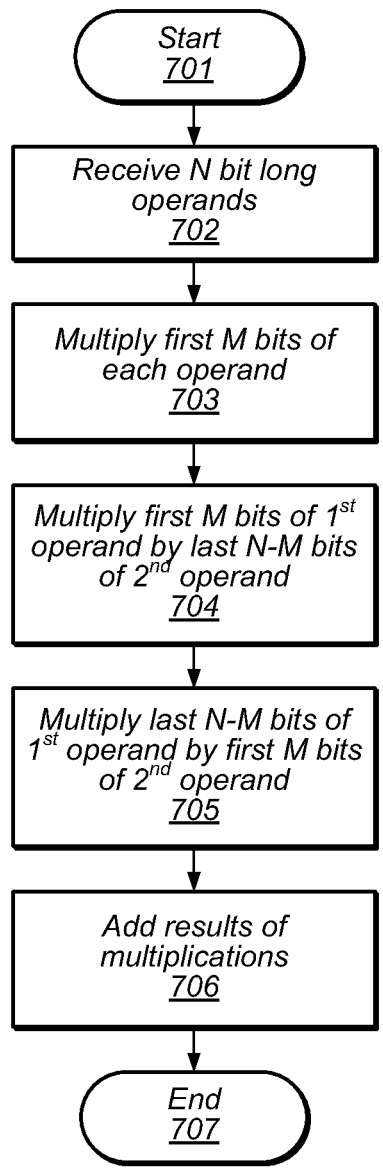
FIG. 7 depicts a flow diagram illustrating an example method for operating a multiplier unit.

Turning to FIG. 7, a flow diagram depicting a method for operating a multiplier unit, such as, e.g., multiplier unit 300 of FIG. 3, is illustrated. The method may begin in block 701. N-bit long (where N is a positive integer) operands may then be received (block 702). In various embodiments, the operands may correspond to a dividend and divisor for a division operation. It is noted that although the following description is directed towards two operands, in other embodiments, any suitable number of operands may be employed.

Once the operands have been received, the first M-bits of a first operand may be multiplied by the first M-bits of a second operand (block 703). In various embodiments, M is also a positive integer and is less than N. For example, each of the operands may be 61-bits long, and M may be 55, resulting in a multiplication of two 55-bit numbers.

With the completion of the multiplication of the first M-bits of each operand, the first M-bits of the first operand are multiplied by the last N-M bits of the second operand (block 704). For example, bits 1 through 55 of the first operand may be multiplied by bits 56 through 61 of the second operand. In some embodiments, a further simplification may be employed in which only a portion of the first M-bits, such as, e.g., the first 9-bits, may be multiplied by last N-M bits of the second operand.

Continuing, the last N-M bits of the first operand may be multiplied by the first M-bits of the second operand (block 705). As above, in some embodiments, only a portion of the first M-bits of the second operand may be used. For example, bits 56-61 of the first operand may be multiplied by the bits 1-9 of the second operand.

With the completion of the individual multiplication operations completed, the results of each multiplication operation may then be added to form a final answer (block 706). It is noted that although some of intermediate terms were neglected, the precision of the resultant value may be of sufficient precision for use with iterative algorithms, such as, Newton-Raphson and Goldschmidt, for example. In some embodiments, by performing a multiplication operation as a set of smaller multiplication operations, a size of a multiplier array, such as multiplier 303 as illustrated in FIG. 3, may be less than a size if the operands will multiplied in a conventional manner.

It is noted that the method depicted in FIG. 7 is merely an example. In other embodiments, one or more of the operations may be performed in a different order.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a storage circuit configured to receive and store a first source operand and a second source operand;
a multiplier circuit configured to perform, responsive to an operation, a plurality of multiplication operations dependent upon the first source operand and the second source operand to generate a respective plurality of results, wherein each result after an initial result is dependent upon at least one previous result; and
circuitry configured to:
perform a shift operation on a given result of the plurality of results to generate a shifted result, wherein an error of the given result of the plurality of results is less than a predetermined threshold value; and
perform a rounding operation on the shifted result.

2. The apparatus of claim 1, wherein each result of the plurality of results corresponds to an approximation of a result of the operation performed by the multiplier circuit, wherein the operation includes a division operation or a square root operation.

3. The apparatus of claim 1, wherein to perform the shift operation, the circuitry is further configured to perform the shift operation responsive to a determination that the given result is denormal or an integer.

4. The apparatus of claim 1, wherein to perform the rounding operation, the circuitry is further configured to perform a first rounding operation and a second rounding operation.

5. The apparatus of claim 1, wherein each result of the plurality of results corresponds to an approximation of a square root of the first source operand.

6. The apparatus of claim 5, wherein to perform the shift operation, the circuitry is further configured to determine a number of bits to shift dependent upon the first source operand and the second source operand.

7. The apparatus of claim 4, wherein the first rounding operation comprises a decrement operation, and the second rounding operation comprises an increment operation.

8. A method, comprising:
receiving a first operand and a second operand;
performing an operation dependent upon the first operand and the second operand, wherein the operation includes a plurality of iterations;

performing, in response to a determination that the operation has completed, a shift operation on an approximation of a result of the operation to generated a shifted approximation; and performing a rounding operation dependent upon the shifted approximation.

9. The method of claim 8, wherein the operation comprises a division operation.

10. The method of claim 8, wherein the operation comprises a square root operation.

11. The method of claim 8, wherein performing the operation comprises performing a back multiplication operation.

12. The method of claim 11, wherein performing the rounding operation comprises performing a first rounding operation dependent upon the shifted approximation and a second rounding operation dependent upon the shifted approximation.

13. The method of claim 12, further comprising selecting a result from the first rounding operation and the second rounding operation dependent upon a result of the back multiplication operation.

14. The method of claim 12, wherein the first rounding operation comprises a decrement operation, and the second rounding operation comprises an increment operation.

15. A system, comprising:
  a register configured to:
    receive at least two N-bit operands, wherein N is a positive integer; and
    store the at least two N-bit operands;
  a multiplier circuit configured to:
    multiply a first M-bits of a first operand of the at least two N-bit operands by a first M-bits of a second operand of the at least two N-bit operands to generate a first product, wherein M is a positive integer less than N;
    multiply the first M-bits of the first operand of the at least two N-bit operands by a last N-M bits of the second operand to generate a second product;
    multiply a last N-M bits of the first operand of the at least two N-bit operands by the first M-bits of the second operand of the at least two N-bit operands to generate a third product; and
    add the first product, the second product, and the third product, to generate a result.

16. The system of claim 15, wherein the system further comprises circuitry configured to:
  perform a shift operation on the result; and
  perform a rounding operation on the result.

17. The system of claim 16, wherein to perform the rounding operation, the circuitry is further configured to perform, in parallel, a decrement operation on the result to generate a first rounded result, and an increment operation on the result to generate a second rounded result.

18. The system of claim 17, wherein the circuitry is further configured to perform a back multiplication dependent upon the result, and wherein to perform the rounding operation, the circuitry is further configured to select one of the first rounded result and the second rounded result dependent upon a result of the back multiplication.

19. The system of claim 16, wherein to perform the shift operation, the circuitry is further configured to determine a number of bits to shift dependent upon the at least two N-bit operands.

20. The system of claim 16, wherein to perform the shift operation, the circuitry is further configured to perform the shift operation responsive to a determination that the result is denormal or an integer.

* * * * *